United States Patent
Tsuzumi et al.

(10) Patent No.: US 11,945,028 B2
(45) Date of Patent: Apr. 2, 2024

(54) MOLD POWDER FOR CONTINUOUS CASTING OF Al-CONTAINING SUB-PERITECTIC STEEL AND CONTINUOUS CASTING METHOD

(71) Applicant: JFE STEEL CORPORATION, Tokyo (JP)

(72) Inventors: Kenji Tsuzumi, Tokyo (JP); Hideya Masaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 342 days.

(21) Appl. No.: 17/616,525

(22) PCT Filed: Jun. 3, 2020

(86) PCT No.: PCT/JP2020/021918
§ 371 (c)(1),
(2) Date: Dec. 3, 2021

(87) PCT Pub. No.: WO2020/246498
PCT Pub. Date: Dec. 10, 2020

(65) Prior Publication Data
US 2022/0226886 A1 Jul. 21, 2022

(30) Foreign Application Priority Data

Jun. 4, 2019 (JP) ................................. 2019-104488

(51) Int. Cl.
| | | |
|---|---|---|
| B22D 11/108 | (2006.01) | |
| B22D 11/111 | (2006.01) | |
| B22D 11/16 | (2006.01) | |
| C04B 35/14 | (2006.01) | |
| C22C 38/00 | (2006.01) | |
| C22C 38/02 | (2006.01) | |
| C22C 38/06 | (2006.01) | |
| C22C 38/22 | (2006.01) | |
| C22C 38/38 | (2006.01) | |

(52) U.S. Cl.
CPC .......... *B22D 11/165* (2013.01); *B22D 11/108* (2013.01); *B22D 11/111* (2013.01); *C04B 35/14* (2013.01); *C22C 38/001* (2013.01); *C22C 38/002* (2013.01); *C22C 38/02* (2013.01); *C22C 38/06* (2013.01); *C22C 38/22* (2013.01); *C22C 38/38* (2013.01)

(58) Field of Classification Search
CPC ............................ B22D 11/108; B22D 11/111
See application file for complete search history.

(56) References Cited

U.S. PATENT DOCUMENTS

| | | | |
|---|---|---|---|
| 2011/0094703 A1 | 4/2011 | Miyake et al. | |
| 2017/0129005 A1 | 5/2017 | Balichev et al. | |
| 2019/0060985 A1 | 2/2019 | Hanao et al. | |

FOREIGN PATENT DOCUMENTS

| | | | | |
|---|---|---|---|---|
| CN | 102069157 A | 5/2011 | | |
| CN | 102389955 A | 3/2012 | | |
| CN | 104128578 A | 11/2014 | | |
| EP | 2441541 A1 | * 4/2012 | ........... | B22D 11/001 |
| EP | 3127632 A1 | * 2/2017 | ............... | B22C 3/00 |
| JP | S61-186155 A | 8/1986 | | |
| JP | H08-197214 A | 8/1996 | | |
| JP | 2003-181607 A | 7/2003 | | |
| JP | 2006-110578 A | 4/2006 | | |
| JP | 2007-290007 A | 11/2007 | | |
| JP | 2015-186813 A | 10/2015 | | |
| JP | 2016-059948 A | 4/2016 | | |
| JP | 2017-013082 A | 1/2017 | | |
| JP | 2017-170494 A | 9/2017 | | |
| JP | 2017-528321 A | 9/2017 | | |
| JP | 2019-048316 A | 3/2019 | | |
| WO | 2017/078178 A1 | 5/2017 | | |

OTHER PUBLICATIONS

Mar. 22, 2023 Office Action issued in Korean Patent Application No. 10-2021-7038814.
Oct. 9, 2022 Office Action issued in Chinese Patent Application No. 202080041035.3.
Oct. 5, 2021 Office Action issued in Japanese Patent Application No. 2021-524875.
Apr. 12, 2022 Extended European Search Report issued in European Patent Application No. 20818855.7.
Jul. 14, 2020 International Search Report issued in International Application No. PCT/JP2020/021918.

* cited by examiner

*Primary Examiner* — Kevin E Yoon
(74) *Attorney, Agent, or Firm* — Oliff PLC

(57) ABSTRACT

A mold powder which prevents surface defects from occurring on a surface of a cast slab of Al-containing hypoperitectic steel having Al: 0.2% to 2.0%, by mass %, and, in a hypo-peritectic region, C: 0.08% to 0.17%, by mass %. The mold powder includes CaO, $SiO_2$, $Na_2O$, $Li_2O$, F, and C. $Li_2O/Na_2O$ is 0.6 or more, $1.0 + 0.05 \times Al \leq CaO/SiO_2 \leq 2.0 - 0.35 \times Al$, $10 < Li_2O + 0.5 \times Na_2O + 0.8 \times F < 20$, and $1.00 \leq F/(Li_2O + 0.5 \times Na_2O + 1.46) \leq 1.24$ are satisfied where Al is content by mass % of molten steel, and respective contents of the remaining elements are by mass %. A viscosity of the mold powder at 1,300° C. is in a range of 0.05 Pa·s to 0.20 Pa·s, and a crystallization temperature of the mold powder is in a range of 1,100° C. to 1,250° C.

16 Claims, No Drawings

MOLD POWDER FOR CONTINUOUS CASTING OF Al-CONTAINING SUB-PERITECTIC STEEL AND CONTINUOUS CASTING METHOD

TECHNICAL FIELD

This application relates to a mold powder for continuous casting, the mold powder having an Al (aluminum) content of 0.2% by mass to 2.0% by mass and a carbon content in a hypo-peritectic region and being capable of preventing longitudinal cracking, transverse cracking, corner cracking, and depressions from occurring on a surface of a continuously cast slab of Al-containing hypo-peritectic steel. Furthermore, the application relates to a method for continuously casting Al-containing hypo-peritectic steel using the mold powder.

BACKGROUND

In the continuous casting of steel, when hypo-peritectic steel with a carbon content in a hypo-peritectic region is solidified, a solidified shell is distorted due to the rapid change in volume of a solid phase in association with δ→γ peritectic transformation and irregularities are likely to occur on a surface of the solidified shell. Herein, the carbon content in the hypo-peritectic region depends on the composition of an alloy and is generally in the range of 0.08% by mass to 0.17% by mass. As a result, a depressed portion of the solidified shell is apart in distance from a mold, is slowly solidified, and locally has a reduced thickness. It is known that thermal strain, transformation strain, slab drawing force, and the like concentrate on the portion with a reduced thickness to cause surface cracking in a continuously cast slab.

The surface cracking of a cast slab deteriorates the surface quality of the cast slab to reduce the yield of good cast slabs, causes a breakout in which a solidified shell is broken during continuous casting and molten steel leaks, and is therefore problematic from the viewpoint of the stability and safety of operation.

In order to prevent the surface cracking of a cast slab of hypo-peritectic steel with a carbon content in a hypo-peritectic region, it is known that a method in which cooling in a mold is slowly made and the cooling rate of a solidified shell is reduced is effective. Controlling properties of a mold powder has been performed as one of means for achieving those effects.

The mold powder added onto the surface of molten steel in a mold for continuous casting receives heat from the molten steel to melt; spreads over the surface of the molten steel in the mold, flows from the boundary between the mold and the solidified shell into a space between the mold and the solidified shell; and functions as a lubricant, an oxidation inhibitor, and a heat insulator.

The mold powder, flowing between the mold and the solidified shell, in a molten state is cooled by the mold to crystallize (a phenomenon in which crystals precipitate in a liquid phase) and then solidifies. In this process, the heat transfer between the mold and the solidified shell is significantly inhibited when the mold powder has design of components that precipitate an appropriate crystal species, whereby a slow cooling effect is enhanced. Hitherto, cuspidine ($2SiO_2 \cdot 3CaO \cdot CaF_2$) has been used as the crystal species.

For example, Patent Literature 1 proposes a mold powder in which crystallization is promoted by increasing, with lubricity maintained, the crystallization temperature (the temperature at which crystals precipitate in a liquid phase) to 1,150° C. to 1,250° C. for the purpose of suppressing the surface cracking of a cast slab of medium carbon steel (hypo-peritectic steel). According to Patent Literature 1, using the mold powder prevents the surface cracking of a cast slab of medium carbon steel. Patent Literature 1 describes that increasing the crystallization temperature of the mold powder to higher than 1,250° C. reduced the lubricity of the mold powder, this inhibited the uniform flow of the mold powder between a mold and a solidified shell, and the solidified shell seized the mold to cause a breakout.

However, mold powder for slow cooling for conventional hypo-peritectic steel as described in Patent Literature 1 and a method in which the mold powder is used are not appropriate for the continuous casting of hypo-peritectic steel with an Al content of 0.2% by mass or more. This is for a reason below.

At the contact interface between molten steel and a mold powder, even in hypo-peritectic steel with an Al content of less than 0.2% by mass, Al in the molten steel reduces $SiO_2$ in the mold powder and therefore the composition of the mold powder is such that the amount of $SiO_2$ decreases and the amount of $Al_2O_3$ increases. Here, the change in the amount of the components of the mold powder due to this reaction (oxidation-reduction reaction) is small. However, in hypo-peritectic steel with an Al content of 0.2% by mass or more, the change in the amount of the components of the mold powder due to the oxidation-reduction reaction is large and therefore properties of the mold powder vary significantly with time.

In particular, the reduction in amount of $SiO_2$ and the enrichment of $AlO_3$ promote the precipitation of high-melting point crystals, such as gehlenite ($2CaO \cdot Al_2O_3 \cdot SiO_2$), likely to be heterogeneously formed and inhibit the homogeneous precipitation of cuspidine. Furthermore, the viscosity of the mold powder in a molten state increases non-uniformly and the uniform flow of the mold powder between the mold and the solidified shell is inhibited. A significant increase in crystallization temperature or viscosity promotes the sintering of the mold powder and the occurrence of slag bear (a phenomenon in which a molten mold powder solidifies and adheres to a wall of a mold).

That is, when the Al content of hypo-peritectic steel is 0.2% by mass or more, properties of the mold powder significantly vary to significantly reduce casting stability. This is because the significant variation of properties of the mold powder causes a sticking breakout due to the coarsening of the slag bear or the insufficient flow of the mold powder between the mold and the solidified shell or induces longitudinal cracking, due to variations in cooling conditions in the mold, on a surface of a cast slab.

The formation of the slag bear and the non-uniform variation of viscosity cause local variations in the flow rate of the mold powder and form deep oscillation marks or irregularities (so-called "depressions") on a surface of a cast slab of hypo-peritectic steel. Deep oscillation marks or irregularities on a surface of a cast slab cause the significant transverse cracking or corner cracking of the cast slab and therefore the yield of good cast slabs decreases significantly.

Therefore, mold powders adapted to hypo-peritectic steel containing a high concentration of Al have been developed. For example, Patent Literature 2 proposes a mold powder for slow cooling in which the ratio between components such as CaO, $SiO_2$, an oxide of an alkali metal, and a fluorine compound is controlled and in which cuspidine is a main crystal, as a mold powder for suppressing the longitudinal cracking of hypo-peritectic steel containing 0.1% by mass to 2.0% by mass Al.

However, Patent Literature 2 describes no technical concept for suppressing, together with the longitudinal cracking, the above-mentioned transverse cracking and corner cracking of the cast slab surface.

CITATION LIST

Patent Literature

PTL 1: Japanese Unexamined Patent Application Publication No. 8-197214
PTL 2: Japanese Unexamined Patent Application Publication No. 2015-186813

SUMMARY

Technical Problem

The disclosed embodiments have been made in view of the above circumstances. It is an object of the disclosed embodiments to provide a mold powder capable of preventing longitudinal cracking, transverse cracking, corner cracking, and depressions from occurring on a surface of a continuously cast slab of Al-containing hypo-peritectic steel having an Al content of 0.2% by mass to 2.0% by mass and a carbon content in a hypo-peritectic region (0.08% by mass to 0.17% by mass). Furthermore, it is an object of the disclosed embodiments to provide a method for continuously casting Al-containing hypo-peritectic steel using the mold powder.

Solution to Problem

The inventors have performed intensive studies and investigations to solve the above problem. As a result, the inventors have found guidelines below in regard to designing components of a mold powder for continuous casting of Al-containing hypo-peritectic steel having an Al content of 0.2% by mass to 2.0% by mass and a carbon content in a hypo-peritectic region (0.08% by mass to 0.17% by mass), thereby completing the disclosed embodiments.

(1) <With Regard to Preventing Longitudinal Cracking on Surface of Cast Slab by Uniform Slow Cooling in Mold>

The basicity (basicity=(mass percent CaO)/(mass percent $SiO_2$)) of a mold powder varies continuously from the initial stage to later stage of continuous casting because of the reduction in amount of $SiO_2$ and the enrichment of $Al_2O_3$ in the mold powder due to the oxidation-reduction reaction of molten steel with the mold powder. In order to promote stable formation of crystals in response to the variation of the basicity, the component range of the mold powder in the initial stage of component variation needs to be maximally matched to the proeutectic region of cuspidine ($2SiO_2 \cdot 3CaO \cdot CaF_2$). In addition, the component range of the mold powder in the later stage after component variation needs to be designed such that cuspidine or the complex precipitation of cuspidine and mayenite ($12CaO \cdot 7Al_2O_3$) is obtained.

It has been found that crystal formation conditions that the rate of crystallization is stably high and high slow cooling properties are obtained can be maintained by designing the composition of the mold powder as described above. For this, it is important to set an appropriate basicity ((mass percent CaO)/(mass percent $SiO_2$)) of an initial composition adapted to the Al content of steel. Here, reducing the $Al_2O_3$ content of the initial composition of the mold powder as much as possible is more preferable for the above purpose.

(2) <With Regard to Preventing Depressions, Transverse Cracking, and Corner Cracking, Due to Variation of Properties of Mold Powder and Formation of Slag Bear, on Surface of Cast Slab>

In order to prevent depressions on a surface of a cast slab, a molten mold powder needs to be maintained at low viscosity and needs to be uniformly supplied to the periphery between a mold and a solidified shell. The inventors have found that the change in viscosity of the mold powder is able to be suppressed by appropriately containing F (fluorine), $Na_2O$, and $Li_2O$ in the mold powder, reducing the viscosity of the initial composition of the mold powder, suppressing the formation of high-melting point crystals due to the enrichment of $Al_2O_3$, and suppressing the increase in temperature of crystallization.

Here, it has become clear that when $Na_2O$ is mainly contained, due to the enrichment of $Al_2O_3$, coarse cuspidine crystals are likely to be non-uniformly formed with nepheline ($NaAlSiO_4$) acting as a nucleus and the formation of sintered granules of the mold powder or slag bear is promoted. The sintered granules of the mold powder are caught between the mold and the solidified shell to enlarge depressions on the cast slab surface, thereby promoting the occurrence of cracking on the cast slab surface. The slag bear promotes the deformation of the tip of the solidified shell or locally inhibit the flow of the mold powder between the mold and the solidified shell to cause the non-uniform solidification of the solidified shell, thereby promoting the occurrence of cracking on the cast slab surface.

Furthermore, when F is excessively contained, the thickness of a molten layer of the mold powder becomes excessively large due to the excessive melting of the mold powder and the crystallization temperature becomes high. This tends to promote the formation of the slag bear.

Therefore, it has been found that the molten state and low viscosity of the mold powder can be stably controlled by appropriately replacing a portion of F and $Na_2O$ with $Li_2O$.

The disclosed embodiments have been made on the basis of the above findings and are as summarized below.

[1] A mold powder for continuous casting of Al-containing hypo-peritectic steel, used to continuously cast Al-containing hypo-peritectic steel which contains 0.2% by mass to 2.0% by mass Al (aluminum) and which has a carbon content in a hypo-peritectic region (0.08% by mass to 0.17% by mass), the mold powder containing, as basic components, CaO, $SiO_2$, $Na_2O$, $Li_2O$, F (fluorine), and C (carbon), in which in an initial composition of the mold powder, "CaO content (mass percent)/$SiO_2$ content (mass percent)" is greater than or equal to "1.0+0.05×[Al content (mass percent) of molten steel]" and less than or equal to "2.0−0.35×[Al content (mass percent) of molten steel]", the $Na_2O$ content is 8% by mass or less, the $Li_2O$ content is 2% by mass to 7% by mass, "$Li_2O$ content (mass percent)/$Na_2O$ content (mass percent)" is 0.6 or more, the F content is in a range satisfying inequalities (1) and (2) below for the $Na_2O$ content and the $Li_2O$ content, the C content is 2% by mass to 10% by mass, the viscosity at 1,300° C. is 0.05 Pa·s to 0.20 Pa·s, and the crystallization temperature is 1,100° C. to 1,250° C.:

$$10 < (Li_2O \text{ content(mass percent)}) + 0.5 \times (Na_2O \text{ content(mass percent)}) + 0.8 \times (F \text{ content(mass percent)}) < 20 \quad (1)$$

$$1.00 \leq (F \text{ content(mass percent)}) / [(Li_2O \text{ content(mass percent)}) + 0.5 \times (Na_2O \text{ content(mass percent)}) + 1.46] \geq 1.24 \quad (2)$$

[2] The mold powder for continuous casting of Al-containing hypo-peritectic steel specified in above [1] further containing one or more of 5% by mass or less $K_2O$, 5% by mass or less MnO, 5% by mass or less MgO, 5% by mass or less $B_2O_3$, and 5% by mass or less BaO in the initial composition of the mold powder.

[3] The mold powder for continuous casting of Al-containing hypo-peritectic steel specified in above [1] or [2], in which the $Al_2O_3$ content is 3% by mass or less in the initial composition of the mold powder.

[4] The mold powder for continuous casting of Al-containing hypo-peritectic steel specified in any one of above [1] to [3], in which supposing that the viscosity at 1,300° C. in the initial composition of the mold powder is $\eta_0$, the crystallization temperature in the initial composition is $T_{CS0}$, the viscosity at 1,300° C. in the composition of the mold powder in which the $SiO_2$ content of the mold powder is reduced from the initial composition by 17.6% by mass and the $Al_2O_3$ content is increased from the initial composition by 20.0% by mass is $\eta_1$, and the crystallization temperature in the composition is $T_{CS1}$, viscosity difference ($\Delta\eta=\eta_1-\eta_0$) between the viscosity $\eta_1$ and the viscosity $\eta_0$ is 0.15 Pa·s or less and crystallization temperature difference ($\Delta T_{CS}=T_{CS1}-T_{CS0}$) between the crystallization temperature $T_{CS1}$ and the crystallization temperature $T_{CS0}$ is 100° C. or less.

[5] A method for continuously casting Al-containing hypo-peritectic steel including supplying the mold powder for continuous casting of Al-containing hypo-peritectic steel specified in any one of above [1] to [4] into a mold for continuous casting when Al-containing hypo-peritectic steel which contains 0.2% by mass to 2.0% by mass Al (aluminum) and which has a carbon content in a hypo-peritectic region (0.08% by mass to 0.17% by mass) is continuously cast, in which the slab drawing speed is 0.7 m/min to 2.0 m/min and the thickness of a mold powder molten layer is $8\times Q^{1/2}$ mm to $18\times Q^{1/2}$ mm for the casting flow rate (Q; tons/min) of molten steel and is 35 mm or less.

Advantageous Effects

According to the disclosed embodiments, the occurrence of longitudinal cracking, transverse cracking, corner cracking, and depressions on a surface of a continuously cast slab of Al-containing hypo-peritectic steel can be prevented. This enables a continuously cast slab of Al-containing hypo-peritectic steel having an Al content of 0.2% by mass to 2.0% by mass and a carbon content in a hypo-peritectic region, the continuously cast slab having excellent surface quality, to be stably manufactured.

DETAILED DESCRIPTION

The disclosed embodiments are described below in detail.

In continuous casting of steel, a mold powder is added to the surface of molten steel in a mold for continuous casting. The mold powder added into the mold is heated by the heat of the molten steel in the mold to have a temperature gradient in which the temperature is high on the side of the mold powder that is in contact with the molten steel in the mold and the temperature is low on the opposite side of the mold powder that is in contact with air. That is, the mold powder on the surface side of the molten steel in the mold is melted to form a molten mold powder layer (referred to as the "mold powder molten layer") on the surface of the molten steel in the mold. On the mold powder molten layer, a mold powder layer (referred to as the "mold powder semi-molten layer") in which a molten layer and a solid layer are present together is formed. On the mold powder semi-molten layer, a mold powder layer (referred to as the "mold powder solid layer") in which, although a portion of C (carbon) contained therein is burned, other components are substantially the same as those in an initial composition is formed. Herein, "the initial composition of the mold powder" is the composition of the mold powder before being added into the mold.

The molten mold powder flows into a space between the mold and a solidified shell and is consumed. Therefore, the molten mold powder is supplied from the mold powder semi-molten layer to the mold powder molten layer so as to compensate for the consumed mold powder. Furthermore, the fresh mold powder is added onto the mold powder solid layer so as to compensate for the consumed mold powder. In this manner, the mold powder functions as a lubricant between the solidified shell and the mold, an oxidation inhibitor for the molten steel in the mold, and a heat insulator.

In continuous casting of Al-containing hypo-peritectic steel which contains 0.2% by mass to 2.0% by mass Al and which has a carbon content in a hypo-peritectic region (0.08% by mass to 0.17% by mass), the composition of the mold powder molten layer is varied by the reaction of the mold powder molten layer with Al in molten steel. Since the composition of the mold powder molten layer is varied, high-melting point crystals such as gehlenite ($2CaO \cdot Al_2O_3 \cdot SiO_2$) are formed.

The disclosed embodiments include a technique that is intended to suppress the formation of high-melting point crystals such as gehlenite and to stably and homogeneously precipitate cuspidine ($2SiO_2 \cdot 3CaO \cdot CaF_2$) in the continuous casting of Al-containing hypo-peritectic steel even if the composition of the mold powder molten layer is varied as described above. The stable, homogeneous precipitation of cuspidine enables a slow cooling effect due to the mold powder to be maintained.

The mold powder according to the disclosed embodiments contains, as basic components, CaO (calcium oxide), $SiO_2$ (silicon oxide), $Na_2O$ (sodium oxide), $Li_2O$ (lithium oxide), F (fluorine), and C (carbon) and the control range of those components is controlled as described below.

First, "CaO content (mass percent)/$SiO_2$ content (mass percent)" in the initial composition of the mold powder is set to greater than or equal to "1.0+0.05×[Al content (mass percent) of molten steel]" and less than or equal to "2.0−0.35×[Al content (mass percent) of molten steel]". Herein, [Al content (mass percent) of molten steel] is the Al content of molten steel that is continuously cast. Thus, when the Al content of molten steel that is continuously cast is, for example, 1.0% by mass, "CaO content (mass percent)/$SiO_2$ content (mass percent)" of the mold powder needs to be within the range of 1.05 to 1.65.

As described above, $SiO_2$ in the mold powder molten layer is reduced by Al in molten steel and is reduced in amount. Therefore, the basicity ((mass percent CaO)/(mass percent $SiO_2$)) of the mold powder molten layer increases from the initial stage to later stage of continuous casting. This change is promoted as the Al content of molten steel is higher.

Thus, "CaO content (mass percent)/$SiO_2$ content (mass percent)" in the initial composition of the mold powder, that is, the basicity ((mass percent CaO)/(mass percent $SiO_2$)) is adjusted depending on the Al content of molten steel that is continuously cast such that the minimum basicity of the precipitation region of cuspidine is ensured. In addition, the composition of the mold powder molten layer is designed so as to always overlap the precipitation region of cuspidine even if the basicity ((mass percent CaO)/(mass percent $SiO_2$)) of the mold powder molten layer increases. At the same time, in this region, the precipitation of cuspidine and mayenite ($12CaO \cdot 7Al_2O_3$) can be maximally used even if the composition of the mold powder molten layer varies in the direction of enrichment of $Al_2O_3$ (aluminum oxide).

When "CaO content (mass percent)/$SiO_2$ content (mass percent)" in the initial composition of the mold powder is greater than "2.0−0.35×[Al content (mass percent) of molten steel]", the basicity ((mass percent CaO)/(mass percent $SiO_2$)) of the mold powder molten layer in the later stage of continuous casting increases excessively and the crystallization temperature increases significantly. As a result, a continuous casting operation becomes unstable. In order to prevent this, "CaO content (mass percent)/$SiO_2$ content (mass percent)" in the initial composition of the mold powder is adjusted to a lower value as the Al content of molten steel that is continuously cast is higher. Herein, the "crystallization temperature" is the temperature at which exothermic heat associated with crystal formation is measured when the mold powder completely melted at 1,300° C. in a platinum crucible is constantly cooled at a cooling rate of 5° C./min.

When "CaO content (mass percent)/$SiO_2$ content (mass percent)" in the initial composition of the mold powder is less than 1.0, the crystallization temperature decreases to 1,100° C. or lower and the precipitation of crystals is suppressed. This allows the solidified shell to be strongly cooled, thereby causing longitudinal cracking on a surface of the solidified shell. Furthermore, when $Al_2O_3$ in the mold powder molten layer is enriched to reach the formation region of gehlenite, the viscosity of the mold powder molten layer increases sharply; hence, depressions or transverse cracks in a surface of a cast slab increase.

Even in a region in which "CaO content (mass percent)/$SiO_2$ content (mass percent)" in the initial composition of the mold powder is greater than or equal to 1.0 and less than "1.0+0.05×[Al content (mass percent) of molten steel], a component range in which cuspidine crystals precipitate is partly present. However, in this region, when the mold powder molten layer absorbs $Al_2O_3$ suspended in molten steel and the $Al_2O_3$ content of the mold powder molten layer increases, the composition of the mold powder molten layer varies to the precipitation region of gehlenite. Therefore, there is a risk that the stability of a continuous casting operation decreases.

The above risk increases as the Al content of molten steel is higher. Therefore, as hypo-peritectic steel has a higher Al content, the lower limit of "CaO content (mass percent)/$SiO_2$ content (mass percent)" in the initial composition of the mold powder is adjusted to a higher value so as to maintain a component range in which cuspidine always precipitates stably. Thus, in the disclosed embodiments, "CaO content (mass percent)/$SiO_2$ content (mass percent)" in the initial composition of the mold powder is set to greater than or equal to "1.0+0.05×[Al content (mass percent) of molten steel]".

In the disclosed embodiments, the amounts of blended $Na_2O$, $Li_2O$, and F are appropriately controlled for the purpose of maintaining the viscosity of the mold powder molten layer at a low level and promoting the melting of the mold powder and the uniform flow of the mold powder between the mold and the solidified shell. Details are as described below.

That is, the $Na_2O$ content in the initial composition of the mold powder is set to 8% by mass or less. Since Na has higher affinity to F than Ca, the excessive addition of $Na_2O$ inhibits the formation of cuspidine. Furthermore, when $Na_2O$ is excessively contained, nepheline ($NaAlSiO_4$) is likely to precipitate and coarse cuspidine is likely to be non-uniformly formed with nepheline acting as a nucleus. As a result, a large slag bear is formed to induce the non-uniform flow of the mold powder between the mold and the solidified shell. This influence is significant when the $Na_2O$ content is more than 8% by mass; hence, the upper limit of the $Na_2O$ content is 8% by mass. From the viewpoint of promoting the homogeneous precipitation of fine cuspidine crystals to suppress the surface cracking of the cast slab, the $Na_2O$ content is preferably 5% by mass or less and more preferably 4% by mass or less. On the other hand, the lower limit of the $Na_2O$ content is not limited and the component range is determined depending on an appropriate blending ratio with $Li_2O$ and F described below.

Since the $Na_2O$ content is preferably low as described above, $Li_2O$ can be used, instead of $Na_2O$, as a viscosity modifier and melting accelerator for the mold powder. In this case, when "$Li_2O$ content (mass percent)/$Na_2O$ content (mass percent)" in the initial composition of the mold powder is 0.6 or more, fine uniform cuspidine crystals can be stably formed. Here, when the $Li_2O$ content is less than 2% by mass, this effect is small. Therefore, the $Li_2O$ content is 2% by mass or more. On the other hand, when the $Li_2O$ content is more than 7% by mass, the precipitation of cuspidine is inhibited and production costs of the mold powder increase significantly. Therefore, the upper limit of the $Li_2O$ content is 7% by mass.

When "$Li_2O$ content (mass percent)/$Na_2O$ content (mass percent)" is more than 2.0, negative effects such as the inhibition of cuspidine precipitation and the significant increase in production costs of the mold powder appear in some cases. Thus, "$Li_2O$ content (mass percent)/$Na_2O$ content (mass percent)" is preferably 2.0 or less.

F (fluorine) is essential for the formation of cuspidine and has a large effect of suppressing an increase in viscosity when the $Al_2O_3$ content increases; hence, a certain amount or more of F is contained. However, the excessive addition of F relative to $Na_2O$ and $Li_2O$ excessively promote the melting of the mold powder to excessively increase the thickness of the mold powder molten layer. Therefore, as a result, the distance from the surface of the molten steel in the mold to the upper surface of the mold powder molten layer increases and the temperature of the mold powder molten layer decreases, thereby promoting the increase in viscosity of the mold powder molten layer and the coarsening of slag bear. This causes deep oscillation marks or depressions on a surface of the cast slab.

Therefore, in the initial composition of the mold powder, the $Na_2O$ content, the $Li_2O$ content, and the F content are adjusted to a range satisfying Inequality (1) below.

$$10 < (Li_2O \text{ content(mass percent)}) + 0.5 \times (Na_2O \text{ content(mass percent)}) + 0.8 \times (F \text{ content(mass percent)}) < 20 \quad (1)$$

Herein, when "($Li_2O$ content (mass percent))+0.5×($Na_2O$ content (mass percent))+0.8×(F content (mass percent))" is 10 or less, the viscosity of the initial composition of the mold powder is slightly high and the increase in viscosity thereof becomes large when the $Al_2O_3$ content of the mold powder molten layer increases. These deteriorate the uniform flow of the mold powder between the mold and the solidified shell. Thus, in the disclosed embodiments, "($Li_2O$ content (mass percent))+0.5×($Na_2O$ content (mass percent))+0.8×(F content (mass percent))" is more than 10 from the viewpoint of maintaining the low viscosity and uniform flow of the mold powder.

On the other hand, when "($Li_2O$ content (mass percent))+ 0.5×($Na_2O$ content (mass percent))+0.8×(F content (mass percent))" is 20 or more, slag forming properties of the mold powder are excessively good, and sintering of the mold powder and slag bear increase. In order to prevent these, in the disclosed embodiments, "($Li_2O$ content (mass percent))+ 0.5×($Na_2O$ content (mass percent))+0.8×(F content (mass percent))" is less than 20.

When F is contained excessively relative to $Na_2O$ or $Li_2O$, though it is easy to obtain cuspidine crystals, the surface quality of the cast slab is impaired by the formation of slag bear or an increase in viscosity in association with the increase of the crystallization temperature. Therefore, in the initial composition of the mold powder, the $Na_2O$ content, the $Li_2O$ content, and the F content are adjusted to a range satisfying Inequality (2) below.

$$1.00 \leq (\text{F content (mass percent)}) / [(\text{Li}_2\text{O content (mass percent)}) + 0.5 \times (\text{Na}_2\text{O content (mass percent)}) + 1.46] \geq 1.24 \quad (2)$$

Herein, the $Na_2O$ content, the $Li_2O$ content, and the F content are adjusted so as to satisfy that "(F content (mass percent))/[($Li_2O$ content (mass percent))+0.5×($Na_2O$ content (mass percent))+1.46]" is 1.24 or less, thereby enabling the viscosity and the crystallization temperature to be appropriately adjusted. On the other hand, when "(F content (mass percent))/[($Li_2O$ content (mass percent))+0.5×($Na_2O$ content (mass percent))+1.46]" is less than 1.00, F combines with, for example, $Na_2O$ or $Li_2O$, the amount of F necessary to form cuspidine decreases, and the formation of crystals decreases. Thus, "(F content (mass percent))/[($Li_2O$ content (mass percent))+0.5×($Na_2O$ content (mass percent))+1.46]" is 1.00 or more.

C (carbon) is a component which functions as a melting rate modifier for the mold powder and which is essential for the mold powder. When the C content is less than 2% by mass, the melting rate of the mold powder is excessively high. This leads to formation of aggregates in which the unmolten mold powder is caught and is solidified, causes the coarsening of slag bear and the engagement of contaminants, and causes the destabilization of a continuous casting operation. Thus, in the initial composition of the mold powder, the lower limit of the C content is 2% by mass.

On the other hand, when the carbon content is more than 10% by mass, the spread of the molten mold powder is suppressed excessively and therefore the risk of a breakout due to insufficient lubrication between the mold and the solidified shell increases. Thus, in the initial composition of the mold powder, the C content is 10% by mass or less.

Furthermore, in the initial composition of the mold powder, the composition may contain one or more of 5% by mass or less $K_2O$, 5% by mass or less MnO, 5% by mass or less MgO, 5% by mass or less $B_2O_3$, and 5% by mass or less BaO. These components may be used as flux instead of $Na_2O$ and $Li_2O$. However, the excessive addition of a solvent inhibits the precipitation of cuspidine to reduce the crystallization temperature and causes the coarsening of slag bear due to the excessive melting of the mold powder as described above. Thus, the sum of the contents of these components is preferably 5% by mass or less and more preferably 3% by mass or less. The addition of $B_2O_3$ causes the movement of B (boron) from the mold powder molten layer to molten steel, increases the B content of molten steel to cause the hardening and embrittlement of the solidified shell, and causes the deterioration in surface quality of the cast slab. Therefore, the amount of added $B_2O_3$ is preferably less than 2% by mass.

In the initial composition of the mold powder, the content of $Al_2O_3$ is preferably low. In the initial composition of the mold powder, the less the content of $Al_2O_3$ is, the more the mold powder molten layer can be maintained in a component range in which the precipitation of cuspidine can be used and changes in properties of the mold powder molten layer can be stabilized at a low level. Therefore, in the initial composition of the mold powder, the content of $Al_2O_3$ is preferably 3% by mass or less and more preferably 2% by mass or less.

Adjustment to the above composition range allows the mold powder for continuous casting of Al-containing hypoperitectic steel according to the disclosed embodiments to be controlled to have characteristic properties below. The range and purpose of properties are described below.

Initial properties of the mold powder are preferably controlled to a range below in view of changes in properties due to the enrichment of $Al_2O_3$.

The crystallization temperature of the mold powder is 1,100° C. to 1,250° C. When the crystallization temperature is lower than 1,100° C., a slow cooling effect is insufficient and longitudinal cracking occurs on a surface of the cast slab. However, when the crystallization temperature is higher than 1,250° C., there is a risk of a breakout because the crystallization temperature is excessively high and the fluidity of the mold powder is inhibited.

The viscosity of the mold powder at 1,300° C. is 0.05 Pa·s to 0.20 Pa·s. When the viscosity at 1,300° C. is less than 0.05 Pa·s, scab defects due to the mold powder may possibly occur in steel products because the mold powder molten layer is incorporated in molten steel by a turbulent flow on the surface of the molten steel in the mold and adheres to an inner layer of the solidified shell. However, when the viscosity at 1,300° C. is more than 0.20 Pa·s, the insufficient flow or non-uniform flow of the mold powder between the mold and the solidified shell is caused and furthermore the formation of slag bear is caused because the maximum viscosity is excessively high when the viscosity of the mold powder molten layer increases in association with the enrichment of $AlO_3$. These cause a breakout or the surface cracking of the cast slab.

When changes in properties in association with the enrichment of $Al_2O_3$ are large, variations in properties of the mold powder molten layer increase to destabilize a continuous casting operation. Therefore, the increment of the crystallization temperature and the increment of the viscosity are preferably suppressed to a low level. In the mold powder according to the disclosed embodiments, the $Na_2O$ content, the $Li_2O$ content, and the F content are adjusted to the above ranges, whereby even if the reduction in amount of $SiO_2$ and the enrichment of $AlO_3$ occur with respect to the initial composition of the mold powder, the changes of the crystallization temperature and the viscosity in association with these changes are suppressed. This is a feature of the mold powder according to the disclosed embodiments.

The viscosity in the initial composition of the mold powder at 1,300° C. is represented by $\eta_0$ and the crystallization temperature in the initial composition is represented by $T_{CS0}$. Supposing that $SiO_2$ of the initial composition of the mold powder is reduced by Al, the viscosity of the mold powder molten layer at 1,300° C. in a composition in which the $SiO_2$ content is reduced by 17.6% by mass from the initial composition and the $Al_2O_3$ content is increased by 20.0% by mass from the initial composition is represented by $\eta_1$ and the crystallization temperature in this composition is represented by $T_{CS1}$.

In the mold powder of the above composition according to the disclosed embodiments, viscosity difference ($\Delta\eta=\eta_1-\eta_0$) between the viscosity $\eta_1$ and the viscosity $\eta_0$ is controlled to 0.15 Pa·s or less and crystallization temperature difference ($\Delta T_{CS}=T_{CS1}-T_{CS0}$) between the crystallization temperature $T_{CS1}$ and crystallization temperature $T_{CS0}$ is controlled to 100° C. or lower.

When the changes in viscosity and crystallization temperature of the mold powder molten layer are larger than the above, the crystallization behavior of the mold powder and the flow behavior of the mold powder between the mold and the solidified shell rapidly vary due to the enrichment of $Al_2O_3$ and variations depending on places in the mold increase. As a result, surface defects of the cast slab are not able to be prevented and the risk of a breakout increases.

Herein, the viscosity of the mold powder was measured by a platinum ball draw-up method after the mold powder was charged into a platinum crucible and was completely melted by heating to 1,300° C. in a ring furnace. In this measurement, the temperature of the mold powder was measured with a thermocouple placed on an outer surface layer of the platinum crucible, and was calibrated with the difference from the inside temperature of the crucible which was determined in advance. The temperature of the molten mold powder was measured in such a manner that the platinum crucible containing the molten mold powder was cooled at a cooling rate of 5° C./min in terms of furnace body temperature. The temperature at which the cooling rate of the mold powder fell below the cooling rate of the furnace body temperature was taken as the exothermic onset temperature associated with crystal formation, which was defined as the crystallization temperature.

Casting conditions in a continuous casting method according to embodiments using the mold powder according to the disclosed embodiments that has the above composition and properties are described below.

The mold powder according to the disclosed embodiments is applied to Al-containing hypo-peritectic steel which contains 0.2% by mass to 2.0% by mass Al and which has a carbon content in a hypo-peritectic region (0.08% by mass to 0.17% by mass). In the case of Al-containing hypo-peritectic steel with an Al content of more than 2.0% by mass, it is very difficult to maintain changes in properties due to the enrichment of $Al_2O_3$ within a predetermined range. On the other hand, Al-containing hypo-peritectic steel with an Al content of less than 0.2% by mass can be dealt with a conventional mold powder for continuous casting of hypo-peritectic steel. Of course, the mold powder according to the disclosed embodiments may be used to continuously cast Al-containing hypo-peritectic steel with an Al content of less than 0.2% by mass.

The slab drawing speed is preferably 0.7 m/min to 2.0 m/min. When the slab drawing speed is less than 0.7 m/min, the fluidity of the mold powder molten layer is extremely poor and the surface quality of the cast slab deteriorates because the supply of heat to the mold powder added onto the surface of the molten steel in the mold is insufficient and the mold powder is not sufficiently melted. However, when the slab drawing speed is more than 2.0 m/min, the amount of the mold powder flowing between the mold and the solidified shell is insufficient and there is a risk of a breakout.

In relation to the above, it is preferable that, as an indicator for appropriately melting the mold powder, the thickness of the mold powder molten layer is $8\times Q^{1/2}$ mm to $18\times Q^{1/2}$ mm for the casting flow rate (Q; tons/min) of molten steel and is 35 mm or less.

Herein, the molten steel casting flow rate Q is calculated as "Q=7,800 (kg/m³)×cast slab width (m)×cast slab thickness (m)×slab drawing speed (m/min)/10³". The molten steel casting flow rate Q relates to the supply of heat to the mold powder on the surface of the molten steel in the mold and is an important indicator for stably melting the mold powder to allow the molten mold powder to flow between the mold and the solidified shell.

When the thickness of the mold powder molten layer is less than $8\times Q^{1/2}$ mm, the melting rate of the mold powder is insufficient as compared to the consumption thereof and the risk of a breakout due to insufficient lubrication between the mold and the solidified shell increases. In addition, the amount of the mold powder locally flowing between the mold and the solidified shell is likely to vary due to the change in level of the molten steel in the mold, thereby causing longitudinal cracking on a surface of the cast slab.

However, when the thickness of the mold powder molten layer is more than $18\times Q^{1/2}$ mm or more than 35 mm, the distance between the upper surface (particularly the vicinity of the mold) of the mold powder molten layer and the surface of the molten steel in the mold increases, the temperature of the mold powder molten layer decreases, and therefore an increase in viscosity or the formation of slag bear is caused. This induces the occurrence of the surface cracking of the cast slab or a breakout.

As described above, according to the mold powder for continuous casting of Al-containing hypo-peritectic steel and continuous casting method of the disclosed embodiments, the occurrence of longitudinal cracking, transverse cracking, corner cracking, and depressions on a surface of a continuously cast slab of hypo-peritectic steel can be prevented. This enables a continuously cast slab of Al-containing hypo-peritectic steel having an Al content of 0.2% by mass to 2.0% by mass and a carbon content in a hypo-peritectic region, the continuously cast slab being excellent in surface quality, to be stably manufactured.

EXAMPLES

In order to confirm effects of the disclosed embodiments, the crystallization behavior of mold powders was confirmed and a continuous casting test for Al-containing hypo-peritectic steel was carried out.

The compositions of various mold powders that were tested are shown in Table 1. In Table 1, the viscosity and crystallization temperature in the initial composition of each mold powder at 1,300° C. are shown as initial properties. In addition, the viscosity and crystallization temperature at 1,300° C. in a simulated composition supposed that $SiO_2$ in a mold powder is reduced by Al in molten steel, the $SiO_2$ content of the mold powder is reduced by 17.6% by mass from the initial composition, and the $Al_2O_3$ content is increased by 20.0% by mass from the initial composition are shown.

TABLE 1

| | Mold powder | | | | | | | | | | | | | | | | |
|---|---|---|---|---|---|---|---|---|---|---|---|---|---|---|---|---|---|
| | Initial composition (mass percent) | | | | | | | | | | | | Initial composition ratio | | | | |
| | | | | | | | | | | | | | CaO/ SiO$_2$ | Li$_2$O/ Na$_2$O | Li$_2$O + 0.5Na$_2$O + 0.8F | F/(Li$_2$O + 0.5Na$_2$O + 1.46) | |
| Level | SiO$_2$ | Al$_2$O$_3$ | CaO | Na$_2$O | F | Li$_2$O | K$_2$O | MnO | MgO | BaO | B$_2$O$_3$ | C | | | | | |
| A1 | 35.9 | 1.3 | 37.9 | 3.1 | 10.4 | 5.4 | — | — | 0.7 | — | — | 5.3 | 1.06 | 1.74 | 15.30 | 1.237 | |
| A2 | 33.7 | 1.0 | 43.6 | 3.6 | 8.7 | 3.9 | — | — | 0.6 | — | — | 4.7 | 1.29 | 1.08 | 12.69 | 1.215 | |
| A3 | 35.0 | 0.7 | 38.8 | 3.6 | 10.0 | 5.0 | 1.1 | — | 0.5 | 0.5 | — | 4.8 | 1.11 | 1.39 | 14.83 | 1.211 | |
| A4 | 34.0 | 0.5 | 40.0 | 4.1 | 10.4 | 5.4 | — | — | 0.6 | — | — | 5.0 | 1.18 | 1.32 | 15.80 | 1.167 | |
| A5 | 33.7 | 0.6 | 40.1 | 5.0 | 9.9 | 5.2 | — | — | 0.5 | — | — | 5.0 | 1.19 | 1.04 | 15.65 | 1.081 | |
| A6 | 31.6 | 0.5 | 37.6 | 6.1 | 12.0 | 5.4 | — | — | 0.6 | — | 2.0 | 4.3 | 1.19 | 0.89 | 18.09 | 1.211 | |
| A7 | 28.9 | 1.8 | 42.5 | 4.0 | 11.5 | 6.3 | — | — | 0.6 | — | — | 4.4 | 1.47 | 1.58 | 17.53 | 1.178 | |
| A8 | 27.0 | 1.5 | 42.9 | 4.1 | 12.0 | 6.2 | 0.5 | — | 0.7 | — | — | 5.1 | 1.59 | 1.51 | 17.89 | 1.236 | |
| A9 | 30.0 | 1.5 | 40.3 | 4.3 | 10.5 | 5.6 | — | — | 2.6 | — | — | 5.2 | 1.34 | 1.30 | 16.18 | 1.140 | |
| A10 | 30.7 | 0.8 | 40.8 | 4.5 | 11.0 | 5.5 | — | — | — | 2.0 | — | 4.7 | 1.33 | 1.22 | 16.58 | 1.194 | |
| A11 | 30.1 | 6.0 | 40.1 | 4.1 | 10.2 | 5.4 | — | — | — | — | — | 4.1 | 1.33 | 1.32 | 15.64 | 1.145 | |
| A12 | 35.0 | 0.6 | 36.1 | 3.9 | 9.8 | 5.0 | — | 3.1 | 1.0 | — | — | 5.4 | 1.03 | 1.28 | 14.79 | 1.165 | |
| A13 | 31.0 | 1.5 | 41.3 | 4.7 | 10.3 | 4.6 | — | 0.5 | 0.7 | — | 0.5 | 5.0 | 1.33 | 0.98 | 15.19 | 1.225 | |
| B1 | 39.3 | 1.7 | 23.0 | 13.0 | 12.2 | 5.0 | — | — | 0.4 | — | — | 5.3 | 0.59 | 0.38 | 21.30 | 0.941 | |
| B2 | 39.5 | 1.7 | 34.2 | 5.2 | 9.9 | 4.0 | — | — | 0.4 | — | — | 5.2 | 0.87 | 0.77 | 14.55 | 1.228 | |
| B3 | 33.5 | 5.5 | 42.1 | 3.1 | 7.5 | 2.2 | — | — | 0.6 | — | — | 5.5 | 1.26 | 0.71 | 9.77 | 1.440 | |
| B4 | 30.4 | 5.2 | 38.4 | 5.5 | 11.0 | 3.3 | — | — | 0.6 | — | — | 5.5 | 1.26 | 0.60 | 14.88 | 1.465 | |
| B5 | 33.4 | 0.8 | 39.1 | 4.3 | 8.9 | 6.7 | — | — | 0.6 | — | 1.1 | 5.0 | 1.17 | 1.56 | 16.00 | 0.863 | |
| B6 | 31.7 | 2.2 | 39.0 | 10.0 | 11.8 | 0.0 | — | — | 0.3 | — | — | 4.9 | 1.23 | 0.00 | 14.48 | 1.827 | |
| B7 | 28.5 | 2.9 | 46.8 | 5.5 | 11.0 | 0.0 | — | — | 0.5 | — | — | 4.9 | 1.64 | 0.00 | 11.58 | 2.613 | |
| B8 | 30.2 | 0.7 | 41.0 | 4.7 | 14.1 | 2.8 | — | — | 0.6 | — | — | 5.9 | 1.36 | 0.60 | 16.47 | 2.133 | |
| B9 | 27.4 | 1.5 | 35.5 | 7.9 | 14.0 | 6.0 | — | — | 0.6 | — | — | 7.2 | 1.30 | 0.76 | 21.19 | 1.227 | |
| B10 | 27.1 | 2.0 | 42.5 | 10.5 | 11.0 | 2.5 | — | — | 0.5 | — | — | 4.0 | 1.57 | 0.24 | 16.58 | 1.194 | |
| B11 | 23.8 | 0.5 | 48.9 | 4.2 | 11.1 | 6.2 | — | — | 0.5 | — | — | 4.8 | 2.05 | 1.48 | 17.21 | 1.137 | |
| B12 | 21.7 | 4.7 | 42.9 | 3.0 | 8.6 | 8.0 | — | — | 0.6 | — | — | 10.5 | 1.98 | 2.67 | 16.41 | 0.785 | |
| B13 | 31.5 | 1.0 | 39.2 | 2.0 | 8.4 | 4.5 | 6.1 | — | 0.8 | — | — | 6.3 | 1.24 | 2.25 | 12.25 | 1.207 | |
| B14 | 32.2 | 0.5 | 39.1 | 2.3 | 8.7 | 5.2 | — | — | 7.0 | — | — | 5.5 | 1.21 | 2.26 | 13.34 | 1.114 | |
| B15 | 30.3 | 0.6 | 38.0 | 3.0 | 8.4 | 5.0 | — | — | 0.5 | — | 9.0 | 5.0 | 1.25 | 1.67 | 13.25 | 1.055 | |
| B16 | 33.6 | 0.5 | 36.6 | 2.5 | 7.0 | 3.0 | — | — | 0.6 | 10.5 | — | 5.7 | 1.09 | 1.20 | 9.87 | 1.226 | |

| | Mold powder | | | | | |
|---|---|---|---|---|---|---|
| | Initial properties | | At enrichment of Al$_2$O$_3$ by 20.0% by mass | | Changes in properties | |
| Level | Viscosity η$_0$ at 1,300° C. (Pa · s) | Crystallization temperature T$_{CS0}$ (° C.) | Viscosity η$_1$ at 1,300° C. (Pa · s) | Crystallization temperature T$_{CS1}$ (° C.) | Δη (Pa · s) | ΔT$_{CS}$ (° C.) | Remarks |
| A1 | 0.09 | 1144 | 0.15 | 1170 | 0.06 | 26 | Example |
| A2 | 0.08 | 1136 | 0.14 | 1145 | 0.06 | 9 | Example |
| A3 | 0.06 | 1125 | 0.10 | 1130 | 0.04 | 5 | Example |
| A4 | 0.07 | 1131 | 0.15 | 1140 | 0.08 | 9 | Example |
| A5 | 0.09 | 1136 | 0.15 | 1146 | 0.06 | 10 | Example |
| A6 | 0.05 | 1125 | 0.09 | 1130 | 0.04 | 5 | Example |
| A7 | 0.06 | 1166 | 0.13 | 1176 | 0.07 | 10 | Example |
| A8 | 0.06 | 1170 | 0.12 | 1195 | 0.06 | 25 | Example |
| A9 | 0.06 | 1145 | 0.11 | 1152 | 0.05 | 7 | Example |
| A10 | 0.05 | 1132 | 0.09 | 1136 | 0.04 | 4 | Example |
| A11 | 0.09 | 1133 | 0.21 | 1188 | 0.12 | 55 | bxample |
| A12 | 0.07 | 1128 | 0.14 | 1150 | 0.07 | 22 | Example |
| A13 | 0.06 | 1122 | 0.12 | 1136 | 0.06 | 14 | Example |
| B1 | 0.19 | 880 | 0.36 | 1023 | 0.17 | 143 | Comparative example |
| B2 | 0.15 | 989 | 0.38 | 1156 | 0.23 | 167 | Comparative example |
| B3 | 0.11 | 1071 | 0.30 | 1225 | 0.19 | 154 | Comparative example |
| B4 | 0.09 | 1203 | 0.25 | 1311 | 0.16 | 108 | Comparative example |
| B5 | 0.09 | 1100 | 0.23 | 1222 | 0.14 | 122 | Comparative example |
| B6 | 0.08 | 1188 | 0.25 | 1290 | 0.17 | 102 | Comparative example |
| B7 | 0.06 | 1261 | 0.24 | 1374 | 0.18 | 113 | Comparative example |
| B8 | 0.06 | 1285 | 0.22 | 1345 | 0.16 | 60 | Comparative example |
| B9 | 0.05 | 1103 | 0.12 | 1189 | 0.07 | 86 | Comparative example |
| B10 | 0.06 | 1135 | 0.15 | 1264 | 0.09 | 129 | Comparative example |
| B11 | 0.05 | 1030 | 0.11 | 1224 | 0.06 | 194 | Comparative example |
| B12 | 0.06 | 1045 | 0.11 | 1230 | 0.05 | 185 | Comparative example |
| B13 | 0.05 | 1090 | 0.19 | 1168 | 0.14 | 78 | Comparative example |
| B14 | 0.06 | 1050 | 0.18 | 1145 | 0.12 | 95 | Comparative example |
| B15 | 0.07 | 1078 | 0.15 | 1100 | 0.08 | 22 | Comparative example |
| B16 | 0.14 | 990 | 0.31 | 1050 | 0.17 | 60 | Comparative example |

As is clear from Table 1, in Levels A1 to A13 that meet the composition range of a mold powder according to the disclosed embodiments, changes in viscosity and crystallization temperature in association with the enrichment of $Al_2O_3$ are suppressed. In contrast to this, in Levels B1 to B16 that are outside the scope of the disclosed embodiments, a significant increase in viscosity or crystallization temperature is observed and it is clear that the stability of properties is low.

Results of a continuous casting test carried out using the mold powders shown in Table 1 are described below. In the continuous casting test, about 270 tons of three types of molten steels (Steels 1 to 3) having a steel chemical composition shown in Table 2 were continuously cast under casting conditions shown in Table 3 using a vertical bending continuous casting machine. In the continuous casting test, the thickness of a cast slab was 250 mm, the width of the cast slab was 1250 mm, mold-oscillation conditions included a sinusoidal waveform with an amplitude of 3.5 mm (=a stroke of 7.0 mm), and the slab drawing speed was basically 1.3 m/min and was varied from 0.6 m/min to 2.2 m/min.

Each powdery mold powder with a composition shown in Table 1 was periodically and uniformly supplied to the surface of molten steel in a mold such that the consumption of the mold powder was in the range of 0.4 kg/m² to 0.8 kg/m². The thickness of a mold powder molten layer was measured three times in steady casting in which a cast slab with a length of about 40 m was continuously cast from the start of casting. The average thereof was regarded as the typical thickness of the mold powder molten layer.

The cast slab drawn from a mold for continuous casting was intermediately cooled in a secondary cooling zone and was cooled in an upper bending zone and a lower reformation zone under such cooling conditions that the corner temperature of the cast slab as estimated from two-dimensional heat transfer calculation avoided a brittle temperature zone at each steel chemical composition. In each continuous casting test, 12 steady casting zone cast slabs (slab cast slabs) with a predetermined length (about 9 m) were manufactured. The scope of the disclosure is not intended to be limited to the above manufacturing conditions.

TABLE 2

| | Chemical composition of steel (mass percent) | | | | | | | | | |
|---|---|---|---|---|---|---|---|---|---|---|
| | C | Si | Mn | P | S | sol. Al | Cr | Nb | Mo | N |
| Steel 1 | 0.110 | 0.20 | 1.85 | 0.012 | 0.0030 | 0.45 | 0.15 | — | — | 0.0030 |
| Steel 2 | 0.155 | 0.22 | 1.56 | 0.009 | 0.0020 | 0.86 | — | 0.015 | — | 0.0029 |
| Steel 3 | 0.133 | 0.31 | 1.80 | 0.004 | 0.0009 | 1.30 | 0.21 | — | 0.04 | 0.0033 |

TABLE 3

| | | Casting conditions | | | | | | |
|---|---|---|---|---|---|---|---|---|
| Level | Mold powder used | $CaO/SiO_2$ in initial composition of mold powder | Steel component | Min. $CaO/SiO_2$ | Max. $CaO/SiO_2$ | Thickness of slab (mm) | Width of slab (mm) | Slab drawing speed (m/min) |
| 1 | A1 | 1.06 | Steel 1 | 1.02 | 1.84 | 250 | 1250 | 1.3 |
| 2 | A1 | 1.06 | Steel 2 | 1.04 | 1.70 | 250 | 1250 | 1.3 |
| 3 | A1 | 1.06 | Steel 3 | 1.07 | 1.55 | 250 | 1250 | 1.3 |
| 4 | A2 | 1.29 | Steel 1 | 1.02 | 1.84 | 250 | 1250 | 1.3 |
| 5 | A3 | 1.11 | Steel 2 | 1.04 | 1.70 | 250 | 1250 | 1.3 |
| 6 | A3 | 1.11 | Steel 3 | 1.07 | 1.55 | 250 | 1250 | 1.3 |
| 7 | A4 | 1.18 | Steel 2 | 1.04 | 1.70 | 250 | 1250 | 1.3 |
| 8 | A4 | 1.18 | Steel 2 | 1.04 | 1.70 | 250 | 1250 | 0.6 |
| 9 | A4 | 1.18 | Steel 2 | 1.04 | 1.70 | 250 | 1250 | 2.2 |
| 10 | A5 | 1.19 | Steel 2 | 1.04 | 1.70 | 250 | 1250 | 1.3 |
| 11 | A6 | 1.19 | Steel 2 | 1.04 | 1.70 | 250 | 1250 | 1.3 |
| 12 | A7 | 1.47 | Steel 2 | 1.04 | 1.70 | 250 | 1250 | 1.3 |
| 13 | A8 | 1.59 | Steel 1 | 1.02 | 1.84 | 250 | 1250 | 1.3 |
| 14 | A8 | 1.59 | Steel 2 | 1.04 | 1.70 | 250 | 1250 | 1.3 |
| 15 | A8 | 1.59 | Steel 3 | 1.07 | 1.55 | 250 | 1250 | 1.3 |
| 16 | A9 | 1.34 | Steel 2 | 1.04 | 1.70 | 250 | 1250 | 1.3 |
| 17 | A10 | 1.33 | Steel 2 | 1.04 | 1.70 | 250 | 1250 | 1.3 |
| 18 | A11 | 1.33 | Steel 2 | 1.04 | 1.70 | 250 | 1250 | 1.3 |
| 19 | A12 | 1.03 | Steel 1 | 1.02 | 1.84 | 250 | 1250 | 1.3 |
| 20 | A13 | 1.31 | Steel 2 | 1.04 | 1.70 | 250 | 1250 | 1.3 |
| 21 | B1 | 0.59 | Steel 3 | 1.07 | 1.55 | 250 | 1250 | 1.3 |
| 22 | B2 | 0.87 | Steel 1 | 1.02 | 1.84 | 250 | 1250 | 1.3 |
| 23 | B2 | 0.87 | Steel 2 | 1.04 | 1.70 | 250 | 1250 | 1.3 |
| 24 | B2 | 0.87 | Steel 3 | 1.07 | 1.55 | 250 | 1250 | 1.3 |
| 25 | B3 | 1.26 | Steel 2 | 1.04 | 1.70 | 250 | 1250 | 1.3 |
| 26 | B4 | 1.26 | Steel 1 | 1.02 | 1.84 | 250 | 1250 | 1.3 |
| 27 | B4 | 1.26 | Steel 2 | 1.04 | 1.70 | 250 | 1250 | 1.3 |
| 28 | B5 | 1.17 | Steel 2 | 1.04 | 1.70 | 250 | 1250 | 1.3 |
| 29 | B6 | 1.23 | Steel 3 | 1.07 | 1.55 | 250 | 1250 | 1.3 |
| 30 | B7 | 1.64 | Steel 2 | 1.04 | 1.70 | 250 | 1250 | 1.3 |
| 31 | B8 | 1.36 | Steel 3 | 1.07 | 1.55 | 250 | 1250 | 1.3 |
| 32 | B9 | 1.30 | Steel 3 | 1.07 | 1.55 | 250 | 1250 | 1.3 |
| 33 | B10 | 1.57 | Steel 2 | 1.04 | 1.70 | 250 | 1250 | 1.3 |
| 34 | B11 | 2.05 | Steel 1 | 1.02 | 1.84 | 250 | 1250 | 1.3 |
| 35 | B11 | 2.05 | Steel 2 | 1.04 | 1.70 | 250 | 1250 | 1.3 |

TABLE 3-continued

| | | | | | | | | |
|---|---|---|---|---|---|---|---|---|
| 36 | B12 | 1.98 | Steel 2 | 1.04 | 1.70 | 250 | 1250 | 1.3 |
| 37 | B13 | 1.24 | Steel 2 | 1.04 | 1.70 | 250 | 1250 | 1.3 |
| 38 | B14 | 1.21 | Steel 2 | 1.04 | 1.70 | 250 | 1250 | 1.3 |
| 39 | B15 | 1.25 | Steel 2 | 1.04 | 1.70 | 250 | 1250 | 1.3 |
| 40 | B16 | 1.09 | Steel 2 | 1.04 | 1.70 | 250 | 1250 | 1.3 |

| | Casting conditions | Surface quality of slab | | | |
|---|---|---|---|---|---|
| Level | Average thickness of molten layer of mold powder (mm) | Longitudinal cracking (cracks/slab) | Transverse cracking-corner cracking (cracks/slab) | Acceptance rate (%) | Remarks |
| 1 | 19 | 0 | 0 | 100 | Example |
| 2 | 20 | 0 | 0 | 100 | Example |
| 3 | 19 | 0 | 2 | 83 | Example |
| 4 | 22 | 0 | 0 | 100 | Example |
| 5 | 20 | 0 | 0 | 100 | Example |
| 6 | 21 | 0 | 0 | 100 | Example |
| 7 | 23 | 0 | 0 | 100 | Example |
| 8 | 10 | 0 | 3 | 75 | Comparative example |
| 9 | 22 | 1 | 4 | 67 | Comparative example |
| 10 | 22 | 0 | 0 | 100 | Example |
| 11 | 23 | 0 | 0 | 100 | Example |
| 12 | 24 | 0 | 0 | 100 | Example |
| 13 | 26 | 0 | 0 | 100 | Example |
| 14 | 22 | 0 | 0 | 100 | Example |
| 15 | 25 | 0 | 2 | 83 | Example |
| 16 | 21 | 0 | 0 | 100 | Example |
| 17 | 23 | 0 | 0 | 100 | Example |
| 18 | 22 | 1 | 0 | 92 | Example |
| 19 | 26 | 0 | 0 | 100 | Example |
| 20 | 24 | 0 | 0 | 100 | Example |
| 21 | 36 | 5 | 14 | 0 | Comparative example |
| 22 | 25 | 2 | 7 | 33 | Comparative example |
| 23 | 25 | 3 | 8 | 25 | Comparative example |
| 24 | 25 | 5 | 10 | 0 | Comparative example |
| 25 | 25 | 2 | 7 | 50 | Comparative example |
| 26 | 25 | 0 | 3 | 67 | Comparative example |
| 27 | 23 | 0 | 5 | 58 | Comparative example |
| 28 | 25 | 2 | 2 | 75 | Comparative example |
| 29 | 19 | 0 | 6 | 50 | Comparative example |
| 30 | 17 | 1 | 4 | 58 | Comparative example |
| 31 | 21 | 0 | 5 | 58 | Comparative example |
| 32 | 37 | 0 | 6 | 42 | Comparative example |
| 33 | 22 | 1 | 3 | 75 | Comparative example |
| 34 | 26 | 3 | 5 | 58 | Comparative example |
| 35 | 25 | 4 | 7 | 42 | Comparative example |
| 36 | 24 | 3 | 8 | 33 | Comparative example |
| 37 | 22 | 3 | 4 | 58 | Comparative example |
| 38 | 23 | 3 | 5 | 67 | Comparative example |
| 39 | 20 | 6 | 2 | 58 | Comparative example |
| 40 | 20 | 5 | 7 | 8 | Comparative example |

One of the 12 cast slabs manufactured as described above was sampled at random and was used as an investigation object. The whole of a cast slab longitudinal surface and the whole of a cast slab transverse surface were inspected by liquid penetrant testing (color check, an aqueous dye), whereby the number of longitudinal cracks and transverse cracks or corner cracks in each cast slab was investigated. The number of longitudinal cracks and transverse cracks or corner cracks with a length of 10 mm or more in a longitudinal or transverse direction of the cast slab was counted.

Even a cast slab having a longitudinal crack and a transverse crack or a corner crack was determined to be acceptable if such crack was a shallow surface crack removable at a grinder stock removal of 2 mm or less on a cast slab longitudinal surface and a cast slab transverse surface or at a grinder stock removal of 10 mm or less on a cast slab corner. The percentage of the number of acceptable cast slabs in the 12 cast slabs was classified as an acceptance rate.

These results are shown in Table 3 together in the form of cast slab surface quality.

In a case where casting was performed using a mold powder composition and casting conditions within the scope of disclosed embodiments (Levels 1 to 7 and Levels 10 to 20), the occurrence of longitudinal cracks and transverse cracks or corner cracks was extremely rare and the acceptance rate of cast slabs was ensured at 80% or more. On the other hand, in a case where, though a mold powder composition was within the scope of disclosed embodiments, casting conditions were outside the scope of disclosed embodiments, (Levels 8 and 9), the uniform flow of a mold powder between a mold and a solidified shell was inhibited, deep depressions increased, and the occurrence of transverse cracking particularly increased due to the influence thereof.

In a case where the composition of a mold powder was outside the scope of disclosed embodiments (Levels 21 to 40), the mold powder had a low slow cooling effect and longitudinal cracking occurred frequently on a surface of a cast slab. In a mold powder with a poor component balance between $Na_2O$, F, and $Li_2O$, the occurrence of transverse cracking due to the formation of deep depressions increased.

The invention claimed is:

1. A mold powder for continuous casting of Al-containing hypo-peritectic steel, the Al-containing hypo-peritectic steel having Al: 0.2% to 2.0%, by mass %, and, in a hypo-peritectic region, C: 0.08% to 0.17%, by mass %, the mold powder comprising, by mass %:
CaO;
$SiO_2$;
$Na_2O$: 8% or less;
$Li_2O$: 2% to 7%;
F; and
C: 2% to 10%,
wherein $Li_2O/Na_2O$ is 0.6 or more, where respective contents are by mass %,
inequalities (1), (2), and (3) are satisfied:

$$1.01 \leq CaO/SiO_2 \leq 1.93 \quad (1)$$

$$10 < Li_2O + 0.5 \times Na_2O + 0.8 \times F < 20 \quad (2)$$

$$1.00 \leq F/(Li_2O + 0.5 \times Na_2O + 1.46) \leq 1.24 \quad (3)$$

$CaO$, $SiO_2$, $Li_2O$, $Na_2O$, and F are respective contents of the elements by mass % in the mold powder
a viscosity of the mold powder at 1,300° C. is in a range of 0.05 Pa·s to 0.20 Pa·s, and
a crystallization temperature of the mold powder is in a range of 1,100° C. to 1,250° C.

2. The mold powder for continuous casting of Al-containing hypo-peritectic steel according to claim 1, wherein the mold powder further comprises, by mass %, at least one selected from the group consisting of $K_2O$: 5% or less, MnO: 5% or less, MgO: 5% or less, $B_2O_3$: 5% or less, and BaO: 5% or less.

3. The mold powder for continuous casting of Al-containing hypo-peritectic steel according to claim 2, wherein a viscosity difference ($\Delta\eta = \eta_1 - \eta_0$) between a viscosity $\eta_1$ and a viscosity $\eta_0$ is 0.15 Pa·s or less, and a crystallization temperature difference ($\Delta T_{CS} = T_{CS1} - T_{CS0}$) between a crystallization temperature $T_{CS1}$ and a crystallization temperature $T_{CS0}$ is 100° C. or less,
where $\eta_0$ is a viscosity at 1,300° C. in an initial composition of the mold powder, $T_{CS0}$ is a crystallization temperature in the initial composition, $\eta_1$ is a viscosity at 1,300° C. in a composition of the mold powder in which $SiO_2$ of the mold powder is reduced from the initial composition by 17.6%, by mass %, and $Al_2O_3$ content is increased from the initial composition by 20.0%, by mass %, and $T_{CS1}$ is a crystallization temperature in the composition.

4. The mold powder for continuous casting of Al-containing hypo-peritectic steel according to claim 1, wherein the mold powder further comprises, by mass %, $Al_2O_3$: 3% or less.

5. The mold powder for continuous casting of Al-containing hypo-peritectic steel according to claim 4, wherein a viscosity difference ($\Delta\eta = \eta_1 - \eta_0$) between a viscosity $\eta_1$ and a viscosity $\eta_0$ is 0.15 Pa·s or less, and a crystallization temperature difference ($\Delta T_{CS} = T_{CS1} - T_{CS0}$) between a crystallization temperature $T_{CS1}$ and a crystallization temperature $T_{CS0}$ is 100° C. or less,
where $\eta_0$ is a viscosity at 1,300° C. in an initial composition of the mold powder, $T_{CS0}$ is a crystallization temperature in the initial composition, $\eta_1$ is a viscosity at 1,300° C. in a composition of the mold powder in which $SiO_2$ of the mold powder is reduced from the initial composition by 17.6%, by mass %, and $Al_2O_3$ content is increased from the initial composition by 20.0%, by mass %, and $T_{CS1}$ is a crystallization temperature in the composition.

6. The mold powder for continuous casting of Al-containing hypo-peritectic steel according to claim 1, wherein a viscosity difference ($\Delta\eta = \eta_1 - \eta_0$) between a viscosity $\eta_1$ and a viscosity $\eta_0$ is 0.15 Pa·s or less, and a crystallization temperature difference ($\Delta T_{CS} = T_{CS1} - T_{CS0}$) between a crystallization temperature $T_{CS1}$ and a crystallization temperature $T_{CS0}$ is 100° C. or less,
where $\eta_0$ is a viscosity at 1,300° C. in an initial composition of the mold powder, $T_{CS0}$ is a crystallization temperature in the initial composition, $\eta_1$ is a viscosity at 1,300° C. in a composition of the mold powder in which $SiO_2$ of the mold powder is reduced from the initial composition by 17.6%, by mass %, and $Al_2O_3$ content is increased from the initial composition by 20.0%, by mass %, and $T_{CS1}$ is a crystallization temperature in the composition.

7. The mold powder for continuous casting of Al-containing hypo-peritectic steel according to claim 1, wherein the mold powder further comprises, by mass %, $Al_2O_3$: 3% or less.

8. The mold powder for continuous casting of Al-containing hypo-peritectic steel according to claim 7, wherein a viscosity difference ($\Delta\eta = \eta_1 - \eta_0$) between a viscosity $\eta_1$ and a viscosity $\eta_0$ is 0.15·Pas or less, and a crystallization temperature difference ($\Delta T_{CS} = T_{CS1} - T_{CS0}$) between a crystallization temperature $T_{CS1}$ and a crystallization temperature $T_{CS0}$ is 100° C. or less,
where $\eta_0$ is a viscosity at 1,300° C. in an initial composition of the mold powder, $T_{CS0}$ is a crystallization temperature in the initial composition, $\eta_1$ is a viscosity at 1,300° C. in a composition of the mold powder in which $SiO_2$ of the mold powder is reduced from the initial composition by 17.6%, by mass %, and $Al_2O_3$ content is increased from the initial composition by 20.0%, by mass %, and $T_{CS1}$ is a crystallization temperature in the composition.

9. A method for continuously casting Al-containing hypo-peritectic steel, the method comprising:
supplying the mold powder for continuous casting of Al-containing hypo-peritectic steel according to claim 1 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and
a thickness of a mold powder molten layer is in a range of $8 \times Q^{1/2}$ mm to $18 \times Q^{1/2}$ mm for a casting flow rate (Q; tons/min) of molten steel and is 35 mm or less.

10. A method for continuously casting Al-containing hypo-peritectic steel, the method comprising:
supplying the mold powder for continuous casting of Al-containing hypo-peritectic steel according to claim 2 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and
a thickness of a mold powder molten layer is in a range of $8 \times Q^{1/2}$ mm to $18 \times Q^{1/2}$ mm for a casting flow rate (Q; tons/min) of molten steel and is 35 mm or less.

11. A method for continuously casting Al-containing hypo-peritectic steel, the method comprising:
supplying the mold powder for continuous casting of Al-containing hypo-peritectic steel according to claim 4 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and a thickness of a mold powder molten layer is in a range of $8 \times Q^{1/2}$ mm to $18 \times Q^{1/2}$ mm for a casting flow rate (Q; tons/min) of molten steel and is 35 mm or less.

12. A method for continuously casting Al-containing hypo-peritectic steel, the method comprising:
supplying the mold powder for continuous casting of Al-containing hypo-peritectic steel according to claim 6 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and a thickness of a mold powder molten layer is in a range of $8 \times Q^{1/2}$ mm to $18 \times Q^{1/2}$ mm for a casting flow rate (Q; tons/min) of molten steel and is 35 mm or less.

13. A method for continuously casting Al-containing hypo-peritectic steel, the method comprising:
supplying the mold powder for continuous casting of Al-containing hypo-peritectic steel according to claim 7 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and a thickness of a mold powder molten layer is in a range of $8 \times Q^{1/2}$ mm to $18 \times Q^{1/2}$ mm for a casting flow rate (Q; tons/min) of molten steel and is 35 mm or less.

14. A method for continuously casting Al-containing hypo-peritectic steel, the method comprising:
supplying the mold powder for continuous casting of Al-containing hypo-peritectic steel according to claim 3 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and
a thickness of a mold powder molten layer is in a range of $8 \times Q^{1/2}$ mm to $18 \times Q^{1/2}$ mm for a casting flow rate (Q; tons/min) of molten steel and is 35 mm or less.

15. A method for continuously casting Al-containing hypo-peritectic steel, the method comprising:
supplying the mold powder for continuous casting of Al-containing hypo-peritectic steel according to claim 5 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and
a thickness of a mold powder molten layer is in a range of $8 \times Q^{1/2}$ mm to $18 \times Q^{1/2}$ mm for a casting flow rate (Q; tons/min) of molten steel and is 35 mm or less.

16. A method for continuously casting Al-containing hypo-peritectic steel, the method comprising:
supplying the mold powder for continuous casting of Al-containing hypo-peritectic steel according to claim 8 into a mold for continuous casting when Al-containing hypo-peritectic steel having Al: 0.2% to 2.0%, by mass %, and, in a hypo-peritectic region, C: 0.08% to 0.17%, by mass %, is continuously cast,
wherein a slab drawing speed is in a range of 0.7 m/min to 2.0 m/min, and
a thickness of a mold powder molten layer is in a range of $8 \times Q^{1/2}$ mm to $18 \times Q^{1/2}$ mm for a casting flow rate (Q; tons/min) of molten steel and is 35 mm or less.

* * * * *